(12) United States Patent
Naguib

(10) Patent No.: US 10,839,383 B2
(45) Date of Patent: Nov. 17, 2020

(54) SYSTEM AND METHOD FOR PROVIDING TRANSACTION VERIFICATION

(71) Applicant: GOOGLE LLC, Mountain View, CA (US)

(72) Inventor: Nayer Naguib, Dublin (IE)

(73) Assignee: Google LLC, Mountain View, CA (US)

( * ) Notice: Subject to any disclaimer, the term of this patent is extended or adjusted under 35 U.S.C. 154(b) by 449 days.

(21) Appl. No.: 15/730,444

(22) Filed: Oct. 11, 2017

(65) Prior Publication Data

US 2018/0033004 A1 Feb. 1, 2018

Related U.S. Application Data

(62) Division of application No. 13/750,143, filed on Jan. 25, 2013, now Pat. No. 9,811,827.

(Continued)

(51) Int. Cl.
*G06Q 20/38* (2012.01)
*G06Q 20/40* (2012.01)
*G06Q 20/32* (2012.01)

(52) U.S. Cl.
CPC ..... *G06Q 20/3825* (2013.01); *G06Q 20/3227* (2013.01); *G06Q 20/401* (2013.01)

(58) Field of Classification Search
None
See application file for complete search history.

(56) References Cited

U.S. PATENT DOCUMENTS

| 5,673,316 A | 9/1997 | Auerbach et al. |
| 5,790,664 A | 8/1998 | Coley et al. |

(Continued)

FOREIGN PATENT DOCUMENTS

| EP | 0 736 827 A2 | 10/1996 |
| EP | 2 343 678 A1 | 7/2011 |

(Continued)

OTHER PUBLICATIONS

U.S. Appl. No. 11/865,453 to Andrew J. Nowka filed Oct. 1, 2007.

(Continued)

*Primary Examiner* — Joseph W. King
(74) *Attorney, Agent, or Firm* — Dority & Manning, P.A.

(57) ABSTRACT

A transaction verification process performed by a transaction network operator in communication with a client computing device and a third party provider. A computing device may be equipped with an integrity verification module for verifying the system integrity of the computing device, and a cryptographic module for digitally signing transaction requests. The transaction network operator may verify that transaction requests processed by the third party provider are properly associated with a valid computing device by verifying signatures from the cryptographic module and the integrity verification module. In response to a request from the third party provider, the transaction network operator may verify that the computing device is authorized to complete the transaction by challenging the computing device for proper credentials. The transaction network operator may verify the credentials provided by the client device and indicate to the third party provider that the transaction is valid.

7 Claims, 5 Drawing Sheets

Related U.S. Application Data

(60) Provisional application No. 61/604,171, filed on Feb. 28, 2012.

(56) References Cited

U.S. PATENT DOCUMENTS

| | | | |
|---|---|---|---|
| 5,802,176 | A | 9/1998 | Audebert |
| 5,862,220 | A | 1/1999 | Perlman |
| 5,956,404 | A | 9/1999 | Schneier et al. |
| 5,991,399 | A | 11/1999 | Graunke et al. |
| 5,995,625 | A | 11/1999 | Sudia et al. |
| 6,044,405 | A | 3/2000 | Driscoll, III et al. |
| 6,055,508 | A | 4/2000 | Naor et al. |
| 6,078,663 | A | 6/2000 | Yamamoto |
| 6,195,541 | B1 | 2/2001 | Griffith |
| 6,269,157 | B1 | 7/2001 | Coyle |
| 6,304,915 | B1 | 10/2001 | Nguyen et al. |
| 6,463,155 | B1 | 10/2002 | Akiyama et al. |
| 6,529,885 | B1 | 3/2003 | Johnson |
| 6,662,020 | B1 | 12/2003 | Aaro et al. |
| 6,920,474 | B2 | 7/2005 | Walsh et al. |
| 6,990,468 | B1 | 1/2006 | Berson et al. |
| 7,072,869 | B2 | 7/2006 | Guthery |
| 7,117,369 | B1 | 10/2006 | Burns et al. |
| 7,275,685 | B2 | 10/2007 | Gray et al. |
| 7,596,529 | B2 | 9/2009 | Mascavage, III et al. |
| 8,041,588 | B2 | 10/2011 | Gilbert et al. |
| 8,108,318 | B2 | 1/2012 | Mardikar |
| 8,121,957 | B1 | 2/2012 | Nowka |
| 8,204,949 | B1 | 6/2012 | Krajec |
| 8,312,523 | B2 | 11/2012 | Geller |
| 8,666,906 | B1 | 3/2014 | Nowka |
| 9,685,024 | B2 * | 6/2017 | Kemper ............... G06Q 20/04 |
| 2002/0016913 | A1 | 2/2002 | Wheeler et al. |
| 2002/0026630 | A1 | 2/2002 | Schmidt et al. |
| 2002/0194119 | A1 | 12/2002 | Wright et al. |
| 2003/0023473 | A1 | 1/2003 | Guyan et al. |
| 2003/0036994 | A1 | 2/2003 | Witzig et al. |
| 2004/0028199 | A1 | 2/2004 | Carlson |
| 2004/0117358 | A1 | 6/2004 | von Kaenel et al. |
| 2004/0193553 | A1 | 9/2004 | Lloyd et al. |
| 2005/0097015 | A1 | 5/2005 | Wilkes et al. |
| 2006/0010418 | A1 | 1/2006 | Gupta et al. |
| 2006/0015717 | A1 | 1/2006 | Liu et al. |
| 2006/0023694 | A1 | 2/2006 | Wilson et al. |
| 2006/0242423 | A1 | 10/2006 | Kussmaul |
| 2007/0038494 | A1 | 2/2007 | Kreitzberg et al. |
| 2007/0088950 | A1 | 4/2007 | Wheeler et al. |
| 2007/0100669 | A1 | 5/2007 | Wargin et al. |
| 2007/0150413 | A1 | 6/2007 | Morgenstern |
| 2007/0219926 | A1 | 9/2007 | Korn |
| 2007/0255653 | A1 | 11/2007 | Tumminaro et al. |
| 2008/0005560 | A1 | 1/2008 | Duffus et al. |
| 2008/0177668 | A1 | 7/2008 | Delean |
| 2008/0288400 | A1 | 11/2008 | Panthaki et al. |
| 2009/0143104 | A1 | 6/2009 | Loh et al. |
| 2009/0281865 | A1 | 11/2009 | Stoitsev |
| 2009/0282247 | A1 | 11/2009 | Kirkup et al. |
| 2010/0002879 | A1 * | 1/2010 | Risley ............... H04L 63/0428 380/255 |
| 2010/0131347 | A1 | 5/2010 | Sartipi |
| 2010/0235275 | A1 | 9/2010 | Ansley |
| 2010/0332402 | A1 | 12/2010 | Kantarjiev et al. |
| 2011/0231332 | A1 | 9/2011 | Abraham et al. |
| 2016/0140547 | A1 | 5/2016 | Naguib |

FOREIGN PATENT DOCUMENTS

| | | |
|---|---|---|
| WO | 98/42098 A1 | 9/1998 |
| WO | 98/52316 A1 | 11/1998 |
| WO | 2008/030513 A2 | 3/2008 |
| WO | 2010/102193 A1 | 9/2010 |
| WO | 2010/102269 A1 | 9/2010 |

OTHER PUBLICATIONS

U.S. Appl. No. 13/398,919 to Andrew J. Nowka filed Feb. 17, 2012.
U.S. Appl. No. 09/596,857 to Berson et al. filed Jun. 19, 2000.
U.S. Appl. No. 13/750,143 to Nayer Naguib filed Jan. 25, 2013.
American Banker, "On-line Banking: TIS Ships Strong Encryption Worldwide", American Banker, vol. 163, No. 33, Feb. 19, 1998, 1 page.
Barber, "Labview: An Implementation of Data Flow Programming in a Graphical Language", Advances in Instrumentation and Control, vol. 44, Part 3, Jan. 1989, 8 pages.
Cheung, "U.S. Office Action issued in copending U.S. Appl. No. 09/596,857, filed Jun. 19, 2000", dated Apr. 20, 2004, 9 pages.
Cheung, "U.S. Office Action issued in copending U.S. Appl. No. 09/596,857, filed Jun. 19, 2000", dated Aug. 30, 2002, 9 pages.
Cheung, "U.S. Office Action issued in copending U.S. Appl. No. 09/596,857, filed Jun. 19, 2000", dated Jan. 18, 2005, 9 pages.
Cheung, "U.S. Office Action issued in copending U.S. Appl. No. 09/596,857, filed Jun. 19, 2000", dated Mar. 11, 2003, 9 pages.
Cheung, "U.S. Office Action issued in copending U.S. Appl. No. 09/596,857, filed Jun. 19, 2000", dated Oct. 3, 2003, 9 pages.
Huang, "U.S. Office Action issued in copending U.S. Appl. No. 11/865,453, filed Oct. 1, 2007", dated Mar. 8, 2010, 17 pages.
Huang, "U.S. Office Action issued in copending U.S. Appl. No. 11/865,453, filed Oct. 1, 2007", dated Apr. 1, 2011, 26 pages.
Huang, "U.S. Office Action issued in copending U.S. Appl. No. 13/398,919, filed Feb. 17, 2012", dated Mar. 21, 2013, 12 pages.
King Jr, "U.S. Office Action issued in copending U.S. Appl. No. 13/750,143, filed Jan. 25, 2013", dated Feb. 27, 2017, 10 pages.
King Jr., "U.S. Office Action issued in copending U.S. Appl. No. 13/750,143, filed Jan. 25, 2013", dated Dec. 17, 2015, 15 pages.
King Jr., "U.S. Office Action issued in copending U.S. Appl. No. 13/750,143, filed Jan. 25, 2013", dated Jun. 30, 2016, 9 pages.
Kozuka, et al., "Component-Based Visual Programming Environment for Cooperative Software Development", Hitachi Review, vol. 45, No. 2, Apr. 1996, 6 pages.
Stambor, "Home Depot Plans to Accept PayPal in all stores", Jan. 25, 2012, 3 pages.

* cited by examiner

SYSTEM AND METHOD FOR PROVIDING TRANSACTION VERIFICATION

CROSS-REFERENCE TO RELATED APPLICATIONS

This application is a divisional of and claims priority to U.S. patent application Ser. No. 13/750,143, filed Jan. 25, 2013 and entitled "System and Method for Providing Transaction Verification," which claims priority under 35 U.S.C. § 119 to U.S. Provisional Patent Application No. 61/604,171, filed Feb. 28, 2012. The complete disclosure of the above-identified priority applications is hereby fully incorporated herein by reference.

BACKGROUND

The disclosure relates generally to computer security and, more particularly, to verifying transactions in a networked computing environment.

Many categories of Internet based services require a high degree of security. Examples include Internet banking, electronic interaction with government services, and documents or files provided with legally binding digital signatures. Typical computing environments may not have adequate security for preventing exposure to attacks that seek to capture user-provided information and to use the captured information to process fraudulent transactions.

Unscrupulous third parties may capture user-provided information in a variety of ways. In one example, a keylogger program may be installed on the user's computer to capture information typed via a keyboard. The keylogger program may be installed by exploiting operating system vulnerabilities or by misleading the user into executing malicious software. In another example, the user may be lead to a malicious website that captures user-provided information. In a further example, a computer display may be manipulated to mislead the user into signing a fraudulent transaction using a legally-binding digital signature.

Existing computer systems are often unable to prevent the capture of information by these sophisticated attacks. Many browsers and Internet security programs warn against visiting websites with invalid security certificates or following phishing links. However, such warnings are commonly ignored. In addition, existing operating systems may be patched at any level (e.g., bootloader, kernel, drivers, etc.). Accordingly, such warnings may be disabled by malicious software.

It may be difficult to avoid malicious software from acting as a keylogger or modifying a user's display. New versions of malicious software are under continuous development, and may be tailored to target a limited set of users. Thus, some malicious software may be undetectable by up-to-date anti-virus and internet security software. In some cases, a computing system may be infected without the user installing any software, as in the case of browser vulnerabilities which allow remote code execution.

SUMMARY

Aspects of the disclosure provide a transaction verification process performed by a transaction network operator in communication with a client computing device and a third party provider. A computing device may be equipped with an integrity verification module for verifying the system integrity of the computing device, and a cryptographic module for digitally signing transaction requests. The transaction network operator may verify that transaction requests processed by the third party provider are properly associated with a valid computing device by verifying signatures from the cryptographic module and the integrity verification module. In response to a request from the third party provider, the transaction network operator may verify that the computing device is authorized to complete the transaction by challenging the computing device for proper credentials. The transaction network operator may verify the credentials provided by the client device and indicate to the third party provider that the transaction is valid. The third party provider may complete the transaction in response to verification of the transaction details by the network operator.

Aspects of the disclosure describe a computer-implemented method for providing a secure transaction. The method includes receiving, from a service provider, a set of transaction details corresponding to the secure transaction, the transaction details describing a transaction between the service provider and a client device, receiving an authorization signature from the client device, wherein the authorization signature verifies that the client device is operating in a secure operating mode, and wherein the authorization signature is not provided to the service provider, verifying, using a processor, the authorization signature by comparing the authorization signature to a stored signature associated with the client device, and instructing the service provider that the secure transaction is approved in response to successful verification of the authorization signature. The method may further include presenting the transaction details to the client device for approval prior to verifying the authorization signature. The method may further include requesting the authorization signature from the client device in response to receiving the set of transaction details. The method may further include instructing the client device to enter a secure operating mode to enable a cryptographic module on the client device to provide the authorization signature. The authorization signature may include an integrity verification signature and a cryptographic signature. The cryptographic signature may be provided by a physical authentication device. The client device may provide a user credential along with the authorization signature, the user credential being issued by a transaction network operator in response to registration of the client device with the transaction network operator. The user credential may be a credit card number or a debit card number. The method may further include notifying a user associated with the client device via a communication channel that the secure transaction has been approved.

Aspects of the disclosure may provide a processing system for providing a secure transaction. The processing system may include a memory, coupled to at least one processor, for storing data corresponding to a list of computing devices registered with the transaction processing system. The at least one processor may be configured to receive transaction details from a service provider corresponding to the secure transaction, determine that a digital signature is associated with at least one computing device of the list of computing devices registered with the transaction processing system, wherein the digital signature is associated with a particular computing device, the digital signature is only available when the computing device is operating in a secure environment, and the digital signature is provided to the processing system by the particular computing device without sending the digital signature to the service provider, and verify the transaction in response to determining that the digital signature is associated with the computing device in the list of computing devices to validate the transaction. The processor may be further configured to receive a user credential associated with the transaction, identify the particular computing device from the list of computing devices based on the user credential, and determine that the digital signature is associated with the particular computing device prior to verifying the transaction. The processor may be further configured to request the digital signature from the computing device. The processor may be further configured to instruct the computing device to reboot into the secure environment. The memory may further store a preferred communication channel associated with at least one of the computing devices and the processor may be further configured to notify a user of the computing device via the preferred communication channel in response to verification of the secure transaction. The preferred communication channel may be at least one of a text message, an e-mail, or a phone call. The processor may be further configured to generate the user credential in response to registration of the particular computing device with the processing system, and to associate the user credential with the particular computing device.

Aspects of the disclosure may provide a non-transitory computer readable storage medium containing instructions that, when executed by a processor cause the processor to execute a method. The method may include receiving, from a service provider, a set of transaction details corresponding to the secure transaction, the transaction details describing a transaction between the service provider and a client device, receiving an authorization signature from the client device, wherein the authorization signature verifies that the client device is operating in a secure operating mode, and wherein the authorization signature is not provided to the service provider, verifying the authorization signature by comparing the authorization signature to a stored signature associated with the client device, and instructing the service provider that the secure transaction is approved in response to successful verification of the authorization signature. The instructions may further include presenting the transaction details to the client device for approval prior to verifying the authorization signature. The instructions may further include requesting the authorization signature from the client device in response to receiving the set of transaction details. The instructions may further include instructing the client device to enter a secure operating mode to enable a cryptographic module on the client device to provide the authorization signature. The authorization signature may include an integrity verification signature and a cryptographic signature. The cryptographic signature may be provided by a physical authentication device. The client device may provide a user credential along with the authorization signature, the user credential being issued by a transaction network operator in response to registration of the client device with the transaction network operator. The user credential may be a credit card number or a debit card number. The method may further include notifying a user associated with the client device via a communication channel that the secure transaction has been approved.

DETAILED DESCRIPTION

The aspects, features and advantages of the present disclosure will be appreciated when considered with reference to the following description of preferred embodiments and accompanying Figures. The following description does not limit the disclosure; rather, the scope is defined by the appended claims and equivalents.

While certain processes in accordance with example embodiments are shown in the Figures as occurring in a linear fashion, this is not a requirement unless expressly stated herein. Different processes may be performed in a different order or concurrently.

The disclosure describes systems and methods for verifying that a transaction is properly authorized by a user of a computing device and to conduct a secure online transaction using the computing device. A computing device may be registered with a transaction network operator as a secure device and, in response to the registration, receive a set of credentials for use on a secure transaction processing network. When the user wishes to perform a transaction using the network, the computing device may be verified as operating in a secure mode before the credentials can be sent over the network. The computing device may ensure that the transaction is being performed in a secure operating environment prior to sending the user's credentials over the network. For example, tamper-resistant boot firmware may initiate a process by which the integrity and security of the computing device's operating environment is verified. In response to verification of the operating environment, a cryptographic module may be enabled on the client device for sending the network credentials used to verify the transaction. The cryptographic module may thus provide the user credentials for use in the network, with the credentials verified by a transaction network operator to authorize transactions. In some aspects, the user may register a communication channel when registering the computing device with the transaction network operator. When a transaction is completed on the transaction verification network, the user may be notified of the transaction via the registered communication channel. Notification in this manner may allow the user to detect fraudulent transactions earlier, thus helping service providers prevent large-scale fraud attacks.

Figure 1:
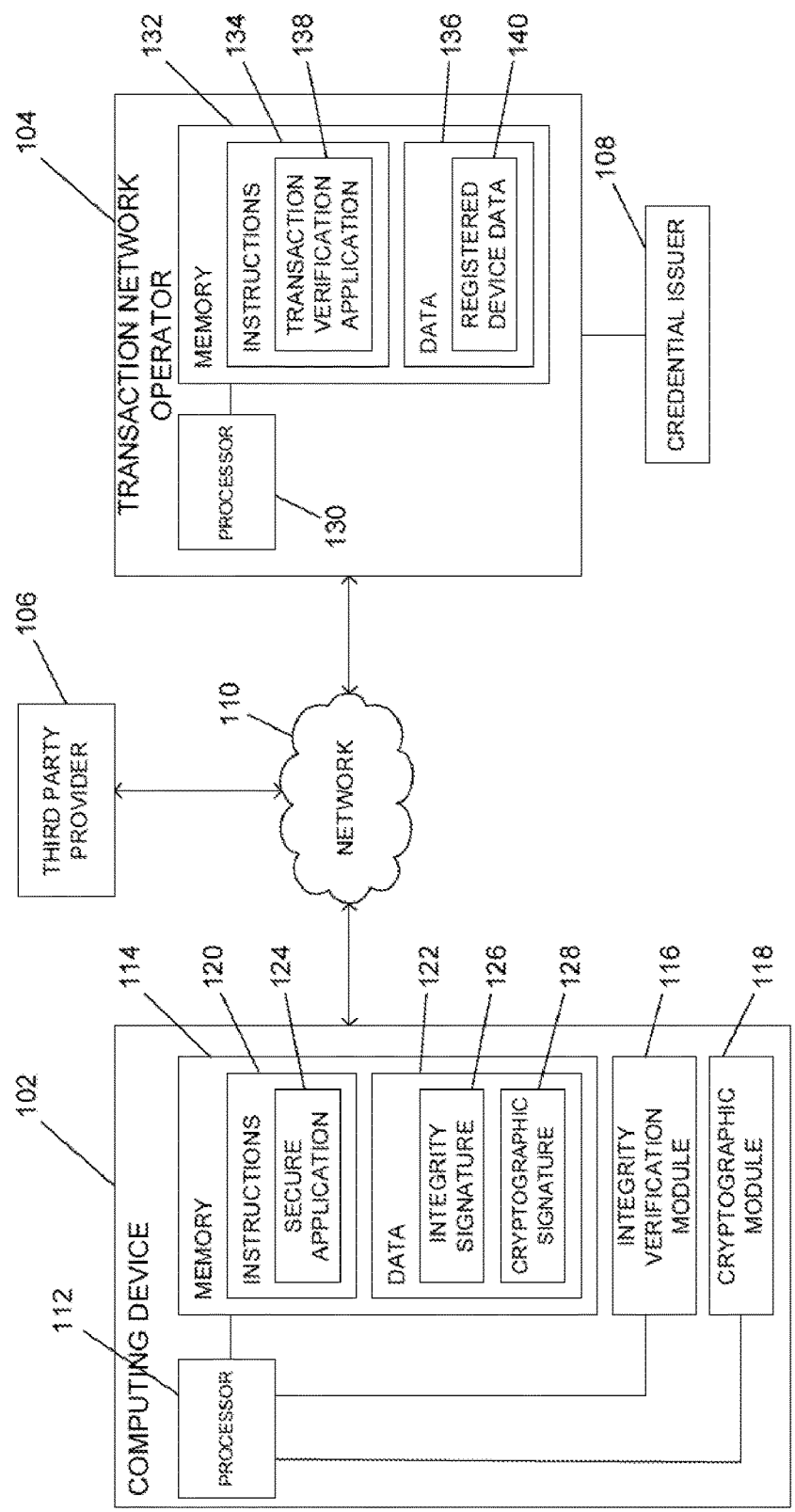
FIG. 1 is a system diagram depicting an example of a transaction verification system in accordance with aspects of the disclosure.

FIG. 1 presents a schematic diagram of a computer system depicting various computing devices that can be used alone or in a networked configuration in accordance with aspects of the disclosure. For example, this Figure illustrates a computer network 100 with a computing device 102, a transaction network operator 104, a third party provider 106, and a credential issuer 108 in communication via a network 110. The computing device 102 allows a user to initiate a transaction with a third party provider 106, such as, for example, an order of a product through an online storefront. The third party provider 106 verifies the transaction with the transaction network operator 104 using credentials provided directly to the transaction network operator 104 by the computing device 102. The transaction network operator 104 verifies the user credentials and transaction details with the credential issuer (e.g., a bank or financial institution) and sends approval of the transaction to the third party provider 106. In response to receiving approval of the transaction, the third party provider 106 completes the transaction with the computing device 102.

The computing device 102 may include a processor 112, a memory 114 and other components typically present in general purpose computers. The memory 114 may store instructions 120 and data 122 that are accessible by the processor 112. The processor 112 may execute the instructions 120 and access the data 122 to control the operations of the computing device 102.

The processor 112 may be any suitable processor, such as various commercially available general purpose processors. Alternatively, the processor 112 may be a dedicated controller such as an application-specific integrated circuit ("ASIC") or a field-programmable gate array ("FPGA").

The memory 114 may be any type of tangible memory operative to store information accessible by the processor 112, including a computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The system and method may include different combinations of the foregoing, whereby different portions of the instructions and data are stored on different types of media.

Although FIG. 1 functionally illustrates the processor 112 and memory 114 as each being within a single block respectively, it should be understood that the processor 112 and memory 114 may actually comprise multiple processors and memories that may or may not be stored within the same physical housing. Accordingly, references to a processor, computer or memory will be understood to include references to a collection of processors, computers or memories that may or may not operate in parallel.

The instructions 120 may be any set of instructions to be executed directly (such as machine code) or indirectly (such as scripts) by the processor 112. For example, the instructions 120 may be stored as computer code on a non-transitory computer-readable medium. In that regard, the terms "instructions" and "programs" may be used interchangeably herein. The instructions 120 may be stored in object code format for direct processing by the processor 112, or in any other computer language including scripts or collections of independent source code modules that are interpreted on demand or compiled in advance. Functions, methods and routines of the instructions are explained in more detail below (see FIGS. 2-6).

In order to facilitate the operations of the computing device 102, the instructions 120 may comprise a secure application 124, such as, for example, a web browser executing in a secure operating mode. The secure application 124 may interact with the third party provider 106 to perform secure transactions across the network. The computing device 102 may be capable of execution in a secure mode and an unsecure mode. In a secure mode, the operating environment may be verified, such as by an integrity verification module, and the computing device 102 may only be permitted to access sites that are known to be trusted and/or verified. For example, the computing device may boot into a secure mode where the operating system is verified prior to boot.

The operating environment in secure mode may boot directly into a web browser, where the user may only visit websites that are known to be trusted, such as government sites or financial institutions. The secure environment may also enable certain cryptographic elements of the computing device, allowing for signing of certain transactions that might otherwise be vulnerable to malicious software in an insecure operating environment. The computing device 102 may also initiate a transaction in an insecure operating environment, with verification performed in a secure environment. For example, a user may initiate an e-commerce transaction with an untrusted or unverified e-commerce site. This transaction may trigger the computing device to reboot into secure mode and verify the transaction with a trusted transaction network operator. In this manner, transactions with untrusted sites may be verified in a secure operating environment even when the transaction is initiated in an insecure operating environment. A method for verifying transactions with untrusted third parties is described further below (see FIG. 3).

Data 122 may be retrieved, stored or modified by the processor 112 in accordance with the instructions. For instance, although the architecture is not limited by any particular data structure, the data may be stored in computer registers, in a relational database as a table having a plurality of different fields and records, Extensible Markup Language ("XML") documents or flat files. The data may also be formatted in any computer readable format such as, but not limited to, binary values or Unicode. The data may comprise any information sufficient to identify the relevant information, such as numbers, descriptive text, proprietary codes, references to data stored in other areas of the same memory or different memories (including other network locations) or information that is used by a function to calculate the relevant data.

The data 122 may store an integrity signature 126 and a cryptographic signature 128. These signatures are provided by the computing device to either a trusted third party provider or a transaction network operator 104 for the purpose of verifying the identity of the computing device. The integrity signature 126 may be provided by an integrity verification module 116, which may be implemented as a tamper-proof device that verifies the integrity of the operating environment. The cryptographic signature 128 may be provided by a cryptographic module 118. The integrity verification module 116 and the cryptographic module 118 are described further below.

The integrity verification module 116 may be a tamper-proof hardware module capable of generating a pair of public-private encryption keys in response to verification of the integrity of the operating environment (e.g., that no untrusted or malicious code is executing). The private encryption key may be securely stored in the integrity verification module 116. The corresponding public key may be exported to preapproved servers across a network. The public key and the private key may be synchronized such that data encrypted with one key can only be decrypted with the corresponding key. The integrity verification module 116 may also have stored thereon instructions that may include any variety of applications. For example, the instructions may instruct the processor 112 to request entry of a valid PIN before allowing access to the private encryption key, to generate a public-private key pair, to generate digital signatures, and to pose challenges or security questions. The instructions may also configure processor 112 to allow initialization or modification of the PIN.

The cryptographic module 118 may be any integrated circuit suitable for cryptoprocessing and signing of transactions. For example, the cryptographic module 118 may be a physical device such as a smart card, a subscriber identity module ("SIM") card, or a customized cryptographic chip that may be embedded or removable from computing device 102. The SIM card may be configured to perform cryptoprocessing functions. The cryptographic module 118 may be assigned a unique identifier by its manufacturer. This identifier may be published together with a public key in order to associate the integrity verification module 116 with its respective public key. In another example, the cryptographic module 118 is a trusted platform module ("TPM") chip configured and arranged in accordance with specifications developed and adopted by the Trusted Computing Group ("TCG"), which is a standard setting entity for hardware security protocols. The cryptographic module 118 may be registered, such as by providing cryptographic module's public key, with the credential issuer 108 and/or transaction network operator 104 to verify transactions signed by the cryptographic module 118 on the transaction processing network 100. In this manner the identity of the client device 102 is ensured prior to approving a transaction with the third party provider 106. Although the integrity verification module 116 and the cryptographic module 118 are represented as separate modules in the instant example, both authorization factors may be replaced with a single physical authentication factor, such as in the case where the computing device will only be used by a single user (e.g., a smartphone), or where the integrity verification hardware may support multiple user profiles.

The third party provider 106 may be any provider that provides a product or service in a computing environment. For example, the third party provider 106 may be an Internet store front, an auction site, a government service provider, or any other e-commerce site. The third party provider 106 verifies transactions initiated by the computing device 102 with the transaction network operator 104.

The transaction network operator 104 may function to verify transactions between the computing device 102 and one or more third party providers 106. In some aspects, the transaction network operator 104 may also act as an intermediary between the computing device 102, the third party provider 106, and a credential issuer 108. For example, the transaction network operator 104 may receive a set of transaction details from the third party provider 106 and a set of credentials from the computing device 102, and verify the transaction details and the credentials with the credential issuer 108. The transaction network operator 104 may interact with a variety of credential issuers in this manner, such as various banks or financial institutions, local, state, or federal governments, or other transaction issuers. In this manner the transaction network operator 104 may operate to verify a variety of different transactions authorized through different credential issuer clearinghouses. Although the instant example primarily describes the verification process as taking place on the transaction network operator 104, remote verification with one or more credential issuers 108 are also possible to facilitate interaction with a variety of credential types, such as credit card numbers, debit card numbers, biometric data, voice identification, etc.

The transaction network operator 104 may be configured similarly to the computing device 102, with a processor 130 coupled to a memory 132. The memory 132 may comprise a set of instructions 134 and data 136 to facilitate the operations of the transaction network operator 104. The instructions 134 may include a transaction verification application 138. The transaction verification application 138 verifies transaction details and user credentials as described above. The transaction verification details may be verified against a set of registered device data 140. This data corresponds to computing devices that have registered their digital signatures, such as the cryptographic signature, for use in the transaction processing system 100. For example, when registering with the transaction network operator, a computing device may provide a public key associated with the computing device's cryptographic module. Methods by which the transaction network operator 104 and the transaction verification application 138 operate are described further below (see FIGS. 2-3, 6).

The computing device 102, the transaction network operator 104, the third party provider 106, and the credential issuer may each be at separate nodes of a network and be operative to directly and indirectly communicate with other nodes of the network 110. For example, the computing device 102 may comprise a client that is operative to communicate with the third party provider 106 and the transaction network operator 104 via the network 110.

The network 110, and the intervening nodes between the computing device 102 and the transaction network operator 104 may comprise various configurations and use various protocols including the Internet, World Wide Web, intranets, virtual private networks, local Ethernet networks, private networks using communication protocols proprietary to one or more companies, cellular and wireless networks (e.g., Wi-Fi), instant messaging, hypertext transfer protocol ("HTTP") and simple mail transfer protocol ("SMTP"), and various combinations of the foregoing. It should be appreciated that a typical system may include a large number of connected computers.

Although certain advantages are obtained when information is transmitted or received as noted above, other aspects of the system and method are not limited to any particular manner of transmission of information. For example, in some aspects, information may be sent via a medium such as an optical disk or portable drive. In other aspects, the information may be transmitted in a non-electronic format and manually entered into the system.

Figure 2:
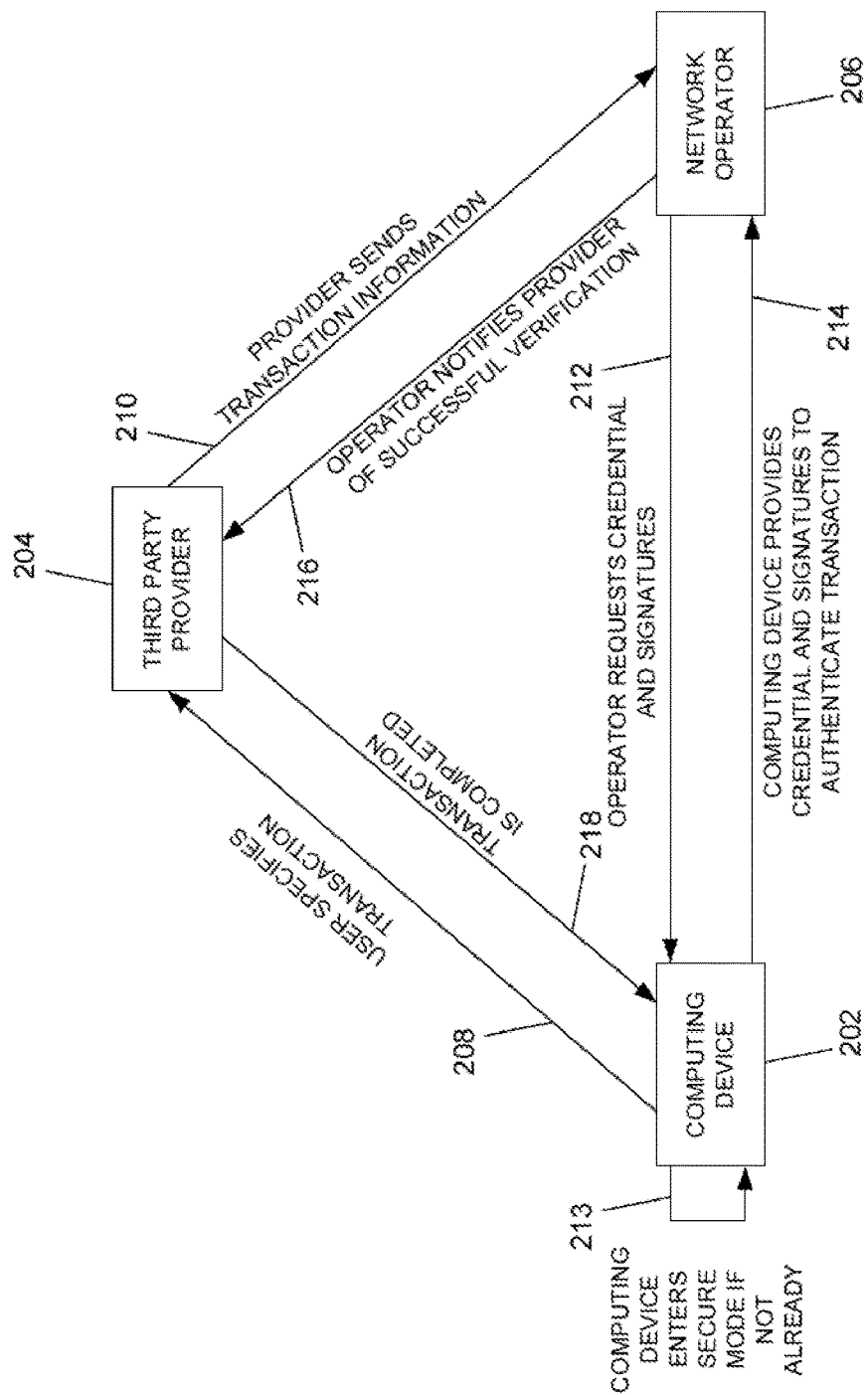
FIG. 2 is block diagram depicting an example of a process flow for verifying a transaction in accordance with aspects of the disclosure.

FIG. 2 is block diagram depicting an example of a process flow 200 for verifying a transaction in accordance with aspects of the disclosure. The process flow illustrates the relationship between a computing device 202, a third party provider 204, and a transaction network operator 206.

As shown by action 208, the computing device 202 specifies a transaction to a third party provider 204, such as an e-commerce purchase. The third party provider 204 receives the transaction information and begins verification of the transaction. At action 210, the provider sends the details of the transaction (e.g., the user's name, shipping address, the goods purchased) to the transaction network operator 206. When a third party provider is trusted, the computing device may access the provider while executing in a secure environment. This may allow the computing device to proceed directly to a page hosted by the network operator 206 to verify the transaction. For example, after providing the transactions details to the third party provider 204, the third party provider 204 may display a link to a page hosted by the transaction network operator 206. The user may select the link to immediately verify the transaction by providing the proper signature(s) and credential(s). For example, the user may be presented with a page allowing entry of a credit card number (previously obtained upon registration of the computing device with the credit card issuer) and a button to securely sign the transaction. The button may only be active when the computing device is executing in a secure environment. If the third party provider 204 is not a trusted provider, the computing device may need to reboot into a secure mode to verify the transaction, as the computing device may not be able to generate the proper signatures unless the computing device is executing in a secure operating mode.

At action 212, the transaction network operator 206 may request the digital signatures and a user credential from the computing device 202. For example, as described above, the user may be linked to a transaction verification page hosted by the transaction network operator 206 upon entering the transaction details with the third party provider 204. The transaction network operator 206 may also send a message to the computing device 202, indicating that a transaction is ready for verification, and that the computing device 202 should reboot into a secure mode to verify the transaction. If the computing device 202 is already in a secure mode, the computing device 202 may prompt the user to verify the transaction upon receiving such a message. The message may be performed in a variety of manners, such as via a TCP/IP connection (e.g., on a particular service port), an e-mail message, an instant message, or any other method of notifying the computing device of a pending secure transaction.

The computing device 202 may provide the digital signatures and credential the next time it is capable of doing so. Since the computing device 202 may be in an insecure mode to initiate the transaction (such as when the third party provider 204 is untrusted, and thus cannot be accessed in a secure mode), the computing device 202 may need to reboot in a secure mode to provide the proper digital signatures. In some aspects, the computing device 202 may prompt the user to reboot into secure mode when a secure transaction notification is received from the transaction network operator. For example, at action 213 the computing device may reboot in secure mode in response to the credential/signature request received from the transaction network operator. Once the computing device 202 is operating in secure mode, this may enable the cryptographic module such that the computing device 202 can properly sign the transaction verification. The computing device 202 may also automatically display a list of pending secure transactions the next time the user enters a secure operating mode.

At action 214, the computing device 202 sends the digital signatures and credential to the transaction network operator 206 to approve the transaction. The transaction network operator 206 verifies that the credential and signatures are valid, such as by comparing the credential and signatures to a database of registered computing devices. At action 216, the transaction network operator 206 notifies the third party provider 204 of the results of the verification operation. If the credential and signatures are valid, the third party provider 204 completes the transaction at action 218. In some aspects, the third party provider 204 may notify the transaction network operator that the transaction is completed, and the transaction network operator may notify the user via a communication channel (e.g., a text message, e-mail, or telephone call) specified when the computing device was registered with the transaction network operator. In this manner, aspects of the disclosure provide for a secure environment for transaction verification, without the need to expose user credentials or private signatures to third party providers.

Figure 3:
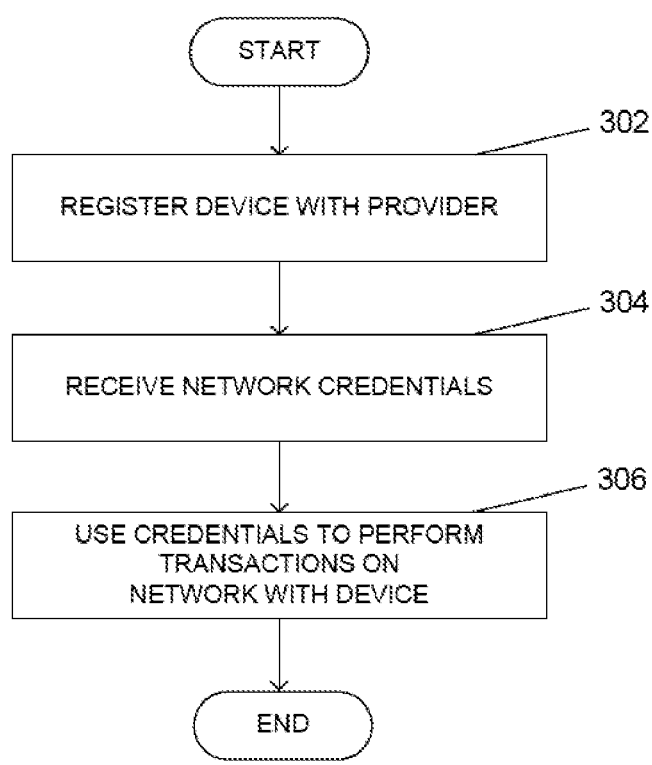
FIG. 3 is a flow diagram depicting an example of a method for registering a computing device with a transaction verification system in accordance with aspects of the disclosure.

FIG. 3 is a flow diagram depicting an example of a method 300 for registering a computing device with a transaction verification system in accordance with aspects of the disclosure. In order to ensure that the computing device may access the transaction verification system, the computing device may first be registered with a transaction network operator. This registration process provides the ability for the transaction network operator to verify that the signatures provided by the computing device are generated by the hardware devices associated with the user credentials associated with the account. This registration process may be performed in person, by, for example, bringing a cryptographic module (e.g., a SIM card) to a location operated by the transaction network operator (e.g., a physical bank branch). Upon verification of the cryptographic module, the transaction network operator may issue the user or computing device credentials for use with the transaction processing network (e.g., a credit card number). These credentials are thus associated with the digital signature provided by the cryptographic module, ensuring that transactions are only possible on the network when using an authorized computing device in conjunction with a valid set of credentials.

At stage 302, the computing device is registered with a network operator. As described above, this process may be accomplished by bringing the computing device or a cryptographic module associated with the computing device (e.g., a SIM card) to a physical location operated by a network provider. For example, the user may bring a SIM card to a bank branch for registration and verification. The user may also store certain user information with the network operator, such as a valid shipping address, an account number, a phone number, or the like. The user may also specify a communication channel upon which to be contacted when a transaction is processed via the network, such as via e-mail, text message, phone call, or the like.

Upon validation of the device or cryptographic module, the network operator may store the public key associated with the cryptographic module and issue a set of credentials corresponding to the user and the computing device. The credentials may be any sort of data suitable to identify the user on the transaction network, such as a credit card number, account number, or digital key. The credentials are received by the computing device at action 304.

At stage 306, the computing device may use the received credentials to perform transactions using the transaction processing network. If a credit card number is provided as a credential, the credit card number may only be valid on the particular transaction processing network, to ensure that there is no risk of fraud if the credit card number falls into the wrong hands.

Figure 4:
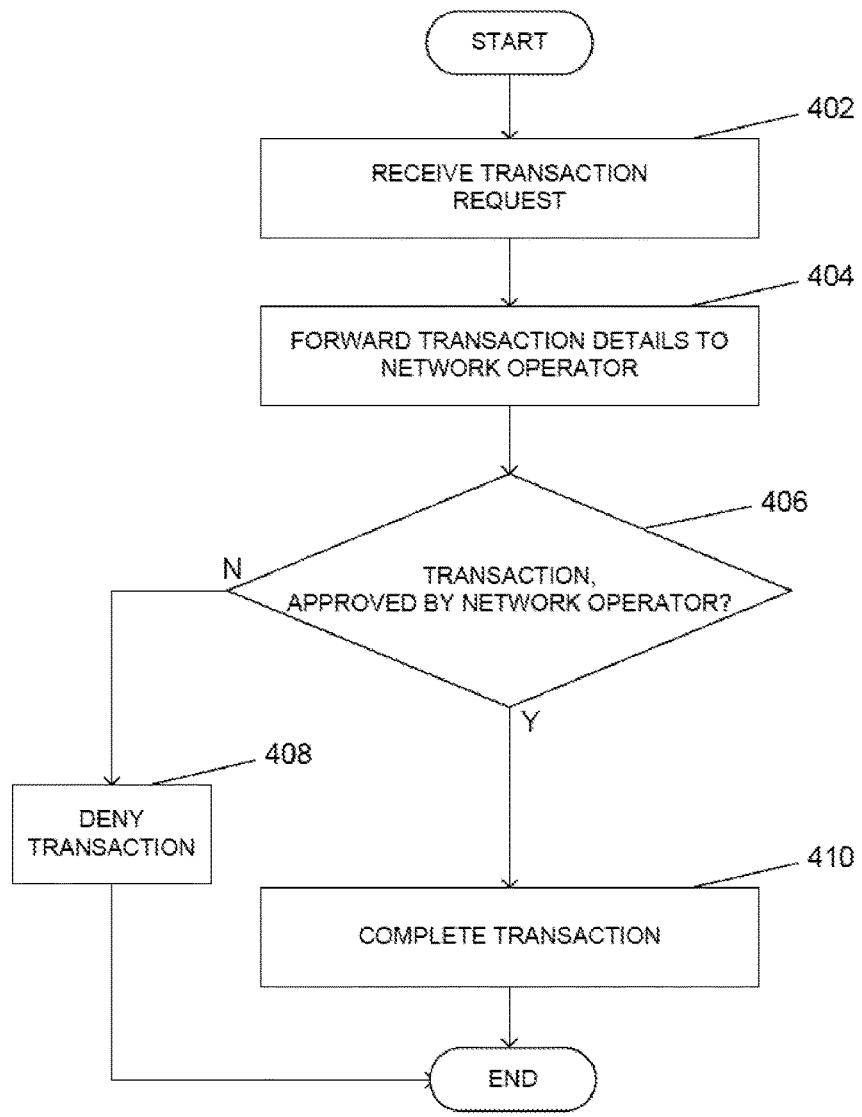
FIG. 4 is a flow diagram depicting an example of a method for processing a transaction by a third party provider using a transaction verification system in accordance with aspects of the disclosure.

FIG. 4 is a flow diagram depicting an example of a method 400 for processing a transaction by a third party provider using a transaction verification system in accordance with aspects of the disclosure. The method 400 describes the process by which a third party provider may validate a transaction request received from a computing device.

At stage 402, the third party provider receives the transaction request. At stage 404, the third party provider forwards the transaction details to the transaction network operator.

At stage 406, the third party provider receives a response from the transaction network operator indicating whether the transaction is approved. For example, the transaction network operator may indicate that the transaction address matches a valid account operated by the transaction network operator, and that the user provided a valid credential and signature in response to a request from the transaction network operator.

At stage 408, the transaction is denied if the transaction network operator does not verify that all of the provided data is valid and matches an active account or registration. If the transaction is approved by the transaction network operator, the transaction is completed by the third party provider at stage 410.

Figure 5:
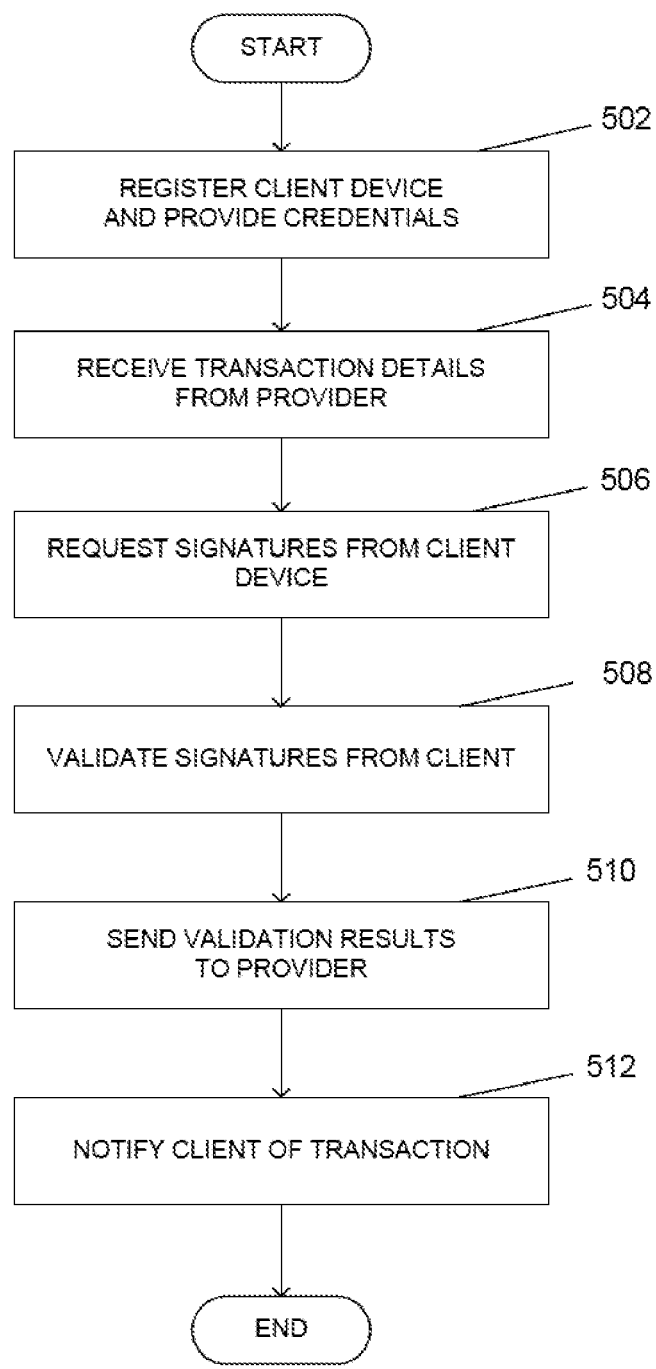
FIG. 5 is a flow diagram depicting an example of a method for verifying a transaction using a transaction network operator in accordance with aspects of the disclosure.

FIG. 5 is a flow diagram depicting an example of a method 500 for verifying a transaction using a transaction network operator in accordance with aspects of the disclosure. The transaction network operator may provide a set of credentials to a user for use on the transaction processing network. For example, as described above with respect to FIG. 3, the user may register a SIM card at their financial institution and receive a credit card number in response. The credit card number may be associated with the particular digital signature of the SIM card, and other user data, such as a shipping address. The transaction network operator may then operate to ensure that any transactions processed using the issued credit card number are also accompanied by the digital signature associated with the SIM card and/or an integrity verification signature associated with the user's computing device.

At stage 502, the user's computing device is registered with the transaction processing network, such as by physically bringing the computing device (or a cryptographic element of the computing device, such as a SIM card) to a particular location, such as a financial institution. The user may be issued a set of credentials, such as a credit card number, for use with the transaction processing network during the registration process.

At stage 504, the transaction network operator receives a transaction request from a third party provider. The transaction request may include various details about the transaction, including a user name, shipping information, price, and the like. The transaction network operator may request credentials from the user directly. The user may also be allowed to validate the transaction on a secure website provided by the network operator, such as, for example, by sending the user directly to the transaction operator web page to complete the transaction rather than providing credentials to the third party website. The transaction processing system may be organized in such a way that user credentials and signatures are only provided directly to the transaction network operator.

The network operator may request the transaction details from the computing device at stage 506. This request may result in the user's computing device entering a secure mode (e.g., by rebooting into a secure mode that is unable to execute arbitrary code) to enable the user to provide the integrity verification signature and the cryptographic signature. Certain third party sites, such as government organizations or financial institutions, may be verified as trusted sites. Trusted sites may be accessed by a user's computing device executing in secure mode, and thus the user may be directed to a verification page hosted by the transaction network operator directly from the third party provider's page. This verification page may allow the user to provide the proper cryptographic and integrity verification signatures to verify the transaction. At stage 508, the signatures received from the user are validated against the data the user previously registered with the system.

At stage 510, the results of the validation steps performed at stage 508 are provided to the third party provider to confirm or deny the transaction.

The user may also be notified of the transaction at stage 512 via a communication channel specified by the user during the registration process performed at stage 502. In this manner users may be immediately notified of transactions performed using their credentials to facilitate fraud detection.

The stages of the illustrated methods are not intended to be limiting. The functionality of the methods can exist in a fewer or greater number of stages than what is shown and, even with the depicted methods, the particular order of events may be different from what is shown in the figures.

The systems and methods described herein advantageously provide for a secure framework to process Internet transactions that includes verification of a secure client computing environment. Notification methods ensure that users are aware of when their credentials are used to limit the potential for wide-scale fraud. Client security is enforced by ensuring that users are operating their computing devices in a secure mode before requesting a transaction to be processed on the network. Such a network is also not limited to purely financial transactions, as various types of credentials may be provided upon device registration. Such credentials may also be used to interact with government services (e.g., register for a social security number, renew a driver's license, vote, etc.). The transaction processing network may enforce the use of credentials that are only useful on the network itself. For example, a user may request a special credit card operated by a major credit card issuer that only operates when used on the transaction network, thus obviating the risk that the card will be used for fraud if lost or stolen. The network may also enforce non-repudiation of transactions, as authorized transactions are signed using the cryptographic signature provided by the cryptographic module owned by the user, and that the signature was provided by a device executing in a secure mode.

As these and other variations and combinations of the features discussed above can be utilized without departing from the disclosure as defined by the claims, the foregoing description of the embodiments should be taken by way of illustration rather than by way of limitation of the disclosure as defined by the claims. It will also be understood that the provision of examples of the disclosure (as well as clauses phrased as "such as," "e.g.", "including" and the like) should not be interpreted as limiting the disclosure to the specific examples; rather, the examples are intended to illustrate only some of many possible embodiments.

The invention claimed is:

1. A processing system for providing a secure transaction, the processing system comprising:
 a memory, coupled to at least one processor, for storing data corresponding to a list of computing devices registered with a processing system; and
 the at least one processor being configured to:
  receive transaction details from a service provider corresponding to a secure transaction, the secure transaction being associated with a particular computing device;
  in response to receiving the transaction details from the service provider, communicate a digital signature request to the particular computing device, the particular computing device being configured to be switched into a secure mode in response to receiving the digital signature request;
  receive, from the particular computing device and subsequent to communicating the digital signature request, a digital signature that is associated with the particular computing device, and wherein the particular computing device is configured to only generate the digital signature once the particular computing device is switched to the secure mode in response to receiving the digital signature request, and wherein the digital signature is not sent to the service provider;

determine that the received digital signature is associated with the particular computing device; and verify the secure transaction in response to determining that the digital signature is associated with the particular computing device in the list of computing devices to validate the transaction.

2. The processing system of claim 1, wherein the processor is further configured to:

receive a user credential associated with the transaction;

identify the particular computing device from the list of computing devices based on the user credential; and determine that the digital signature is associated with the particular computing device prior to verifying the transaction.

3. The processing system of claim 1, wherein the processor is further configured to instruct the particular computing device to reboot into the secure mode.

4. The processing system of claim 1, wherein the memory further stores a preferred communication channel associated with at least one of the computing devices and wherein the processor is further configured to notify a user of the particular computing device via the preferred communication channel in response to verification of the secure transaction.

5. The processing system of claim 4, wherein the preferred communication channel comprises at least one of a text message, an e-mail, or a phone call.

6. The processing system of claim 1, wherein the processor is further configured to generate a user credential in response to registration of the particular computing device with the processing system, and to associate the user credential with the particular computing device.

7. A system for providing a secure transaction, the system comprising:

a memory, coupled to at least one processor, for storing data corresponding to a list of computing devices registered with a processing system; and the at least one processor being configured to:

receive transaction details from a service provider corresponding to a secure transaction, the secure transaction being associated with a particular computing device;

in response to receiving the transaction details from the service provider, communicate a digital signature request to the particular computing device, the particular computing device being configured to be switched into a secure mode in response to receiving the digital signature request;

generate, at a the particular computing device, a digital signature that is associated with the particular computing device, and wherein the particular computing device is configured to only generate the digital signature once the particular computing device is switched into the secure mode in response to receiving the digital signature request;

receive, from the particular computing device and subsequent to communicating the digital signature request, the digital signature, and wherein the digital signature is not sent to the service provider;

determine that the received digital signature is associated with the particular computing device; and verify the secure transaction in response to determining that the digital signature is associated with the particular computing device.

* * * * *